Dec. 6, 1960     T. I. HARRIS     2,962,931

OPTICAL OBJECTIVE

Filed Dec. 12, 1958     2 Sheets-Sheet 1

Inventor:
Thomas I. Harris

United States Patent Office 2,962,931
Patented Dec. 6, 1960

2,962,931
OPTICAL OBJECTIVE

Thomas I. Harris, Mundelein, Ill., assignor to Bell & Howell Company, Chicago, Ill., a corporation of Illinois Filed Dec. 12, 1958, Ser. No. 780,138
3 Claims. (Cl. 88—57)

This invention relates to an optical objective, and more particularly to an optical objective primarily intended for use on a vidicon tube but readily adaptable to photographic and projection purposes, which is corrected for spherical aberration, coma, astigmatism, field curvature, distortion, and chromatic aberrations.

It is an object of the invention to provide an optical objective for a vidicon tube which has a large aperture and a back focal length which is long compared with the effective focal length and the overall length of the objective.

Another object of the invention is to provide an optical objective having five components, the first of which is a strongly negative member, the second a weekly positive member, the third a weakly positive member, and the fourth and fifth positive members. The general aberration correction is characterized by almost complete elimination of primary and higher order spherical aberration, both axial and oblique, and by a flat, anastigmatic focal plane.

Figure 1:
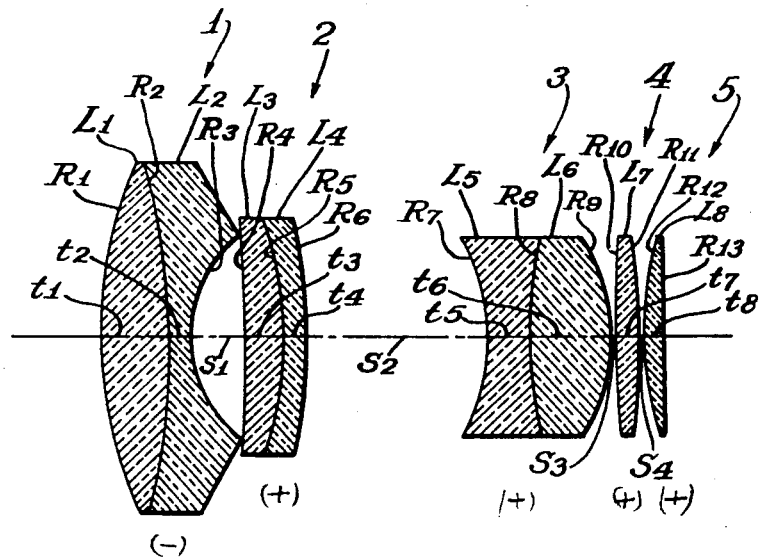
Figure 2:
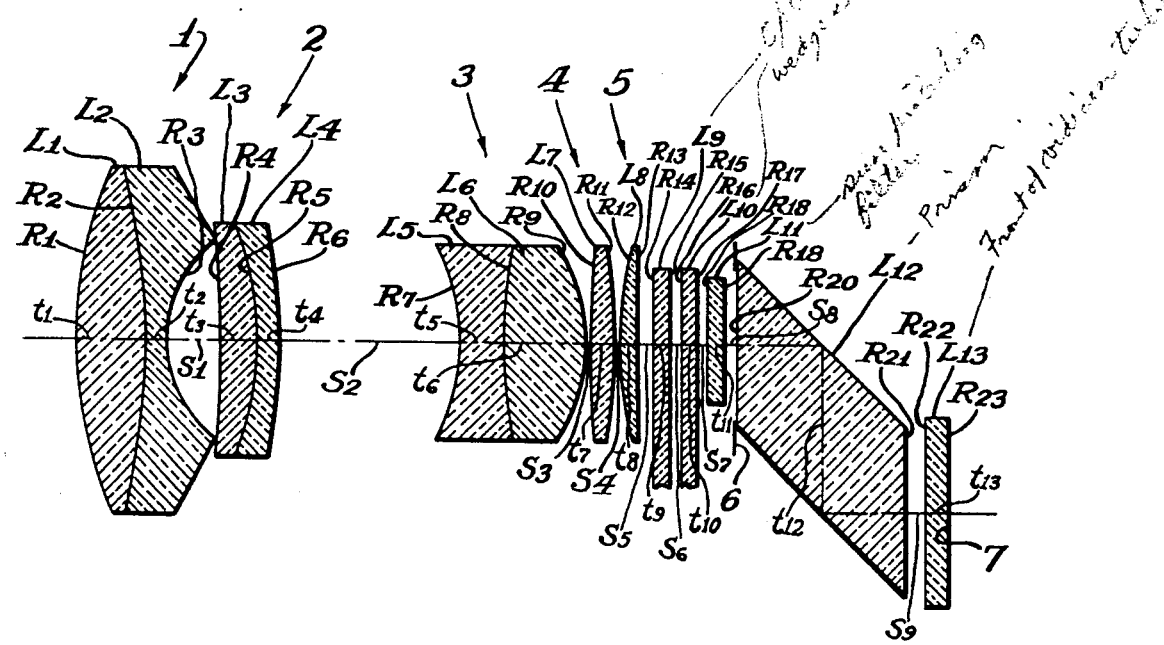

The invention will be better understood by reference to the accompanying drawing in which:

Fig. 1 is a longitudinal section of an optical objective forming one embodiment of the invention; and Fig. 2 is a longitudinal sectional view of the objective shown in Fig. 1 in combination with a vidicon tube shown schematically.

Referring now in detail to the drawings, it is to be understood that the terms "front" and "rear" as herein used refer to the ends of the objective respectively nearer the longer and shorter conjugates thereof.

A first component 1 is a strongly negative meniscus, cemented, doublet of lenses $L_1$ and $L_2$ with the cemented surface $R_2$ convex to stop 6, the primary function of the component 1 being to provide the negative power necessary to obtaining a long back focal length of the objective. The cemented surface $R_2$ is used to reduce the negative distortion and lateral color inherent in a component of this configuration. A second component 2 is a meniscus cemented pair of lenses $L_3$ and $L_4$ with the cemented interface $R_5$ convex to the stop (not shown), which is positioned to the rear of the objective, the primary purpose of the component 2 being the further reduction of distortion and lateral color. Separated by a relatively long air space $s_2$ from the second component 2 is a third component 3 which is a thick cemented pair of lenses $L_5$ and $L_6$. The thickness and shape of the component 3 reduce the field curvature and decrease the necessary diameters of the front and second components 1 and 2. The primary purpose of cemented surface $R_8$ is to correct the spherical aberration and axial color. The separation of the remaining positive power into fourth and fifth components 4 and 5 constituted by lenses $L_7$ and $L_8$, respectively, reduces primary spherical aberration sufficiently so that both primary and higher order spherical aberrations are almost non-existent. The shapes of, and distribution of power between the lenses $L_7$ and $L_8$ are chosen so as to balance the coma and astigmatism of the system. One or more of the above components may be compounded. Also, lenses $L_7$ and $L_8$ may be combined to a single positive member with only a slight loss in quality of correction.

In Fig. 2, the objective is shown in operative position with a vidicon tube and has a focal plane $R_{23}$ with a prism $L_{12}$, planar glass plates $L_9$, $L_{10}$, $L_{11}$ and $L_{13}$ interposed between the lens $L_8$ and the focal plane $R_{23}$, with the correction of the objective balanced to accommodate these plates and to optimize the color correction. The plates $L_9$ and $L_{10}$ are laterally movable optical wedges, the plate $L_{11}$ is a sun protecting filter and the plate $L_{13}$ is the front of the vidicon tube.

In terms of effective focal length F of the objective, the radii of the objetcive designated $R_1$ to $R_{13}$ proceeding from front to rear must be within the following ranges:

$$\frac{1}{6F} < \frac{1}{R_1} < \frac{1}{1.5F}$$

$$\frac{1}{-2.5F} < \frac{1}{R_2} < \frac{1}{-8F}$$

$$\frac{1}{F} < \frac{1}{R_3} < \frac{1}{.6F}$$

$$\frac{1}{-4F} < \frac{1}{R_4} < 0$$

$$\frac{1}{-1.5F} < \frac{1}{R_5} < \frac{1}{-4F}$$

$$\frac{1}{-2.5F} < \frac{1}{R_6} < 0$$

$$\frac{1}{-.9F} < \frac{1}{R_7} < \frac{1}{-2F}$$

$$0 < \frac{1}{R_8} < \frac{1}{1.6F}$$

$$\frac{1}{-.5F} < \frac{1}{R_9} < \frac{1}{-2F}$$

$$0 < \frac{1}{R_{10}} < \frac{1}{4F}$$

$$\frac{1}{-2.5F} < \frac{1}{R_{11}} < \frac{1}{-8F}$$

$$\frac{1}{4F} < \frac{1}{R_{12}} < \frac{1}{1.6F}$$

$$\frac{1}{-4F} < \frac{1}{R_{13}} < \frac{1}{4F}$$

A preferred embodiment of the invention is constructed substantially in conformance with the following table, in which dimensions are in terms of inches, radii of curvature of the optical surfaces respectively designate $R_1$ to $R_{23}$ proceeding from front to rear, $t_1$ to $t_{13}$ the axial thicknesses, $s_1$ to $s_9$ the axial separations, $n_d$ the indices of refraction, and V the Abbe dispersion numbers:

[Equivalent focal length=.6230. Back focal length=(from $R_{13}$) 1.212 (in air)]

| | | | | |
|---|---|---|---|---|
| $L_1$ | $R_1 = +1.664$ | $t_1 = .275$ | $n_d = 1.751$ | $V = 27.7$ |
| | $R_2 = -2.500$ | $t_2 = .080$ | $n_d = 1.613$ | $V = 44.2$ |
| $L_2$ | $R_3 = +.4925$ | $s_1 = .220$ | | |
| | $R_4 = -4.552$ | $t_3 = .150$ | $n_d = 1.720$ | $V = 29.2$ |
| $L_3$ | $R_5 = -1.250$ | $t_4 = .080$ | $n_d = 1.613$ | $V = 44.2$ |
| $L_4$ | $R_6 = -2.220$ | $s_2 = .620$ | | |
| | $R_7 = -.832$ | $t_5 = .280$ | $n_d = 1.751$ | $V = 27.7$ |
| $L_5$ | $R_8 = +2.004$ | $t_6 = .325$ | $n_d = 1.617$ | $V = 64.5$ |
| | $R_9 = -.7019$ | $s_3 = .005$ | | |
| $L_6$ | $R_{10} = +4.363$ | $t_7 = .100$ | $n_d = 1.620$ | $V = 60.3$ |
| | $R_{11} = -2.380$ | $s_4 = .005$ | | |
| $L_7$ | $R_{12} = +1.266$ | $t_8 = .085$ | $n_d = 1.697$ | $V = 56.2$ |
| | $R_{13} = +94.200$ | $s_5 = .0625$ | | |
| | $R_{14} = \infty$ | $t_9 = .0625$ | $n_d = 1.523$ | $V = 58.6$ |
| $L_8$ | $R_{15} = \infty$ | $s_6 = .047$ | | |
| | $R_{16} = \infty$ | $t_{10} = .0625$ | $n_d = 1.523$ | $V = 58.6$ |
| $L_9$ | $R_{17} = \infty$ | $s_7 = .047$ | | |
| | $R_{18} = \infty$ | $t_{11} = .0625$ | $n_d = 1.523$ | $V = 58.6$ |
| $L_{10}$ | $R_{19} = \infty$ | $s_8 = .047$ | | |
| | $R_{20} = \infty$ | $t_{12} = 1.300$ | $n_d = 1.697$ | $V = 56.2$ |
| $L_{11}$ | $R_{21} = \infty$ | $s_9 = .0625$ | | |
| | $R_{22} = \infty$ | $t_{13} = .093$ (Focal Plane) | $n_d = 1.523$ | $V = 58.6$ |
| $L_{12}$ | $R_{23} = \infty$ | | | |

While the invention is thus described, it is not to be limited to the precise details described, as changes may be readily made without departing from the spirit of the invention.

What is claimed is:

1. In an optical objective, first, second, third, fourth and fifth components arranged in the order named; the first component comprising a negative meniscus cemented doublet; the second component comprising a positive meniscus cemented doublet concave to the first component and in edge contact therewith; the third component comprising a cemented meniscus doublet spaced substantially from and concave to the second component; the fourth component being a biconvex singlet and spaced closely to the third component; the fifth component being a positive singlet spaced closely to the fourth component; and further characterized in that the objective is constructed in substantial compliance to the following table in which beginning with the front end of the objective $R_1$ to $R_{13}$ designate the respective radii of curvature and F the equivalent focal length of the objective:

$$\frac{1}{6F} < \frac{1}{R_1} < \frac{1}{1.5F}$$

$$\frac{1}{-2.5F} < \frac{1}{R_2} < \frac{1}{-8F}$$

$$\frac{1}{F} < \frac{1}{R_3} < \frac{1}{.6F}$$

$$\frac{1}{-4F} < \frac{1}{R_4} < 0$$

$$\frac{1}{-1.5F} < \frac{1}{R_5} < \frac{1}{-4F}$$

$$\frac{1}{-2.5F} < \frac{1}{R_6} < 0$$

$$\frac{1}{-.9F} < \frac{1}{R_7} < \frac{1}{-2F}$$

$$0 < \frac{1}{R_8} < \frac{1}{1.6F}$$

$$\frac{1}{-.8F} < \frac{1}{R_9} < \frac{1}{-2F}$$

$$0 < \frac{1}{R_{10}} < \frac{1}{4F}$$

$$\frac{1}{-2.5F} < \frac{1}{R_{11}} < \frac{1}{-8F}$$

$$\frac{1}{4F} < \frac{1}{R_{12}} < \frac{1}{1.6F}$$

$$\frac{1}{-4F} < \frac{1}{R_{13}} < \frac{1}{4F}$$

2. In an optical objective, a first cemented doublet meniscus component, a second cemented doublet meniscus component positioned closely behind the first component, a third cemented doublet meniscus component located a substantial distance behind the second component, and fourth and fifth positive singlets positioned closely behind the third component, and further characterized in that the objective substantially complies with the following table in which dimensions are in terms of inches and beginning with the front end of the objective $L_1$ to $L_8$ designate the lenses of the components, $R_1$ to $R_{13}$ the respective radii of curvature of the surfaces, $t_1$ to $t_8$ the axial thicknesses, $s_1$ to $s_4$ the axial separations, $n_d$ the indices of refraction for the D line and V the Abbe dispersion numbers:

[Equivalent focal length=.6230. Back focal length=1.212 (in air)]

| | | | | |
|---|---|---|---|---|
| $L_1$ | $R_1 = +1.664$ | $t_1 = .275$ | $n_d = 1.751$ | $V = 27.7$ |
| | $R_2 = -2.500$ | $t_2 = .080$ | $n_d = 1.613$ | $V = 44.2$ |
| $L_2$ | $R_3 = +.4925$ | $s_1 = .220$ | | |
| | $R_4 = -4.552$ | $t_3 = .150$ | $n_d = 1.720$ | $V = 29.2$ |
| $L_3$ | $R_5 = -1.250$ | $t_4 = .080$ | $n_d = 1.613$ | $V = 44.2$ |
| $L_4$ | $R_6 = -2.220$ | $s_2 = .620$ | | |
| | $R_7 = -.832$ | $t_5 = .280$ | $n_d = 1.751$ | $V = 27.7$ |
| $L_5$ | $R_8 = +2.004$ | $t_6 = .325$ | $n_d = 1.617$ | $V = 64.5$ |
| | $R_9 = -.7019$ | $s_3 = .005$ | | |
| $L_6$ | $R_{10} = +4.363$ | $t_7 = .100$ | $n_d = 1.620$ | $V = 60.3$ |
| | $R_{11} = -2.380$ | $s_4 = .005$ | | |
| $L_7$ | $R_{12} = +1.266$ | $t_8 = .085$ | $n_d = 1.697$ | $V = 56.2$ |
| | $R_{13} = +94.200$ | | | |

3. In an optical objective system for a vidicon tube and proceeding from front to rear, a front strongly negative meniscus cemented doublet component, a weakly positive meniscus cemented second doublet component in edge contact with the rear of the front doublet component, a weakly positive meniscus cemented third doublet component positioned to the rear of and spaced from the second doublet component, a first positive singlet component positioned closely to the rear of the third doublet component, a second positive singlet component positioned closely to the rear of the first singlet, and five planar glass components positioned behind the second singlet component, and being further characterized in that the system complies substantially with the following table in which the dimensions are in terms of inches and beginning with the front end of the objective $L_1$ to $L_{13}$ designate the lenses of the components $R_1$ to $R_{23}$ the radii of the surfaces, $t_1$ to $t_{13}$ the axial thicknesses, $s_1$ to $s_9$ the axial separations, $n_d$ the indices of refraction for the D line and V the Abbe dispersion numbers:

[Equivalent focal length=.6230. Back focal length (from $R_{13}$)= 1.212 (in air)]

| Lens | R | t/s | $n_d$ | V |
|---|---|---|---|---|
| $L_1$ | $R_1 = +1.664$ | $t_1 = .275$ | $n_d = 1.751$ | $V = 27.7$ |
| $L_2$ | $R_2 = -2.500$ | $t_2 = .080$ | $n_d = 1.613$ | $V = 44.2$ |
|  | $R_3 = +.4925$ | $s_1 = .220$ |  |  |
| $L_3$ | $R_4 = -4.552$ | $t_3 = .150$ | $n_d = 1.720$ | $V = 29.2$ |
| $L_4$ | $R_5 = -1.250$ | $t_4 = .080$ | $n_d = 1.613$ | $V = 44.2$ |
|  | $R_6 = -2.220$ | $s_2 = .620$ |  |  |
| $L_5$ | $R_7 = -.832$ | $t_5 = .280$ | $n_d = 1.751$ | $V = 27.7$ |
|  | $R_8 = +2.004$ | $t_6 = .325$ | $n_d = 1.617$ | $V = 64.5$ |
| $L_6$ | $R_9 = -.7019$ | $s_3 = .005$ |  |  |
| $L_7$ | $R_{10} = +4.363$ | $t_7 = .100$ | $n_d = 1.620$ | $V = 60.3$ |
|  | $R_{11} = -2.380$ | $s_4 = .005$ |  |  |
| $L_8$ | $R_{12} = +1.266$ | $t_8 = .085$ | $n_d = 1.697$ | $V = 56.2$ |
|  | $R_{13} = +94.200$ | $s_5 = .0625$ |  |  |
| $L_9$ | $R_{14} = \infty$ | $t_9 = .0625$ | $n_d = 1.523$ | $V = 58.6$ |
|  | $R_{15} = \infty$ | $s_6 = .047$ |  |  |
| $L_{10}$ | $R_{16} = \infty$ | $t_{10} = .0625$ | $n_d = 1.523$ | $V = 58.6$ |
|  | $R_{17} = \infty$ | $s_7 = .047$ |  |  |
| $L_{11}$ | $R_{18} = \infty$ | $t_{11} = .0625$ | $n_d = 1.523$ | $V = 58.6$ |
|  | $R_{19} = \infty$ | $s_8 = .047$ |  |  |
| $L_{12}$ | $R_{20} = \infty$ | $t_{12} = 1.300$ | $n_d = 1.697$ | $V = 56.2$ |
|  | $R_{21} = \infty$ | $s_9 = .0625$ |  |  |
| $L_{13}$ | $R_{22} = \infty$ | $t_{13} = .093$ (focal plane) | $n_d = 1.523$ | $V = 58.6$ |
|  | $R_{23} = \infty$ |  |  |  |

References Cited in the file of this patent

UNITED STATES PATENTS

| | | |
|---|---|---|
| 2,019,985 | Lee | Nov. 5, 1935 |
| 2,298,853 | Warmisham | Oct. 13, 1942 |
| 2,552,672 | Grey | May 15, 1951 |
| 2,590,917 | Back et al. | Apr. 1, 1952 |
| 2,662,447 | Tronnier | Dec. 15, 1953 |
| 2,780,139 | Lange | Feb. 5, 1957 |
| 2,796,002 | Klemt | June 18, 1957 |
| 2,803,997 | Hopkins | Aug. 27, 1957 |
| 2,824,494 | Klemt | Feb. 25, 1958 |
| 2,835,168 | Lange | May 20, 1958 |
| 2,862,418 | Lowenthal | Dec. 2, 1958 |

FOREIGN PATENTS

| | | |
|---|---|---|
| 766,975 | Great Britain | Jan. 30, 1957 |